United States Patent [19] [11] 4,210,733
Hayashi et al. [45] Jul. 1, 1980

[54] COMPOSITE RESINOUS COMPOSITION

[75] Inventors: Hideo Hayashi; Hisatake Sato, both of Yokohama, Japan

[73] Assignee: Nippon Oil Company, Ltd., Nishi-Shinbashi, Japan

[21] Appl. No.: 893,944

[22] Filed: Apr. 6, 1978

[30] Foreign Application Priority Data

Apr. 11, 1977 [JP] Japan .................................. 52/41056

[51] Int. Cl.$^2$ ............................................. C08L 63/00
[52] U.S. Cl. ..................................... 525/529; 525/109
[58] Field of Search ................... 260/836, 837 R, 829; 525/109, 529

[56] References Cited

U.S. PATENT DOCUMENTS

| | | | |
|---|---|---|---|
| 2,798,866 | 7/1957 | Gordon | 526/76 |
| 2,824,860 | 2/1955 | Aldridge | 526/25 |
| 3,057,614 | 10/1962 | Greenlee | 260/837 R |
| 3,069,373 | 12/1962 | Greenlee | 260/837 R |
| 3,280,215 | 10/1966 | Severance | 260/829 |
| 3,420,915 | 1/1969 | Braithwaite | 260/837 R |
| 3,753,963 | 8/1973 | Hayashi | 260/836 |
| 4,003,959 | 1/1977 | Wada | 260/837 R |
| 4,012,458 | 3/1977 | Wada | 260/837 R |

*Primary Examiner*—Paul Lieberman
*Attorney, Agent, or Firm*—Buchnam and Archer

[57] ABSTRACT

A composite resinous composition is provided, which essentially comprises an aromatic hydrocarbon resin and an epoxy resin. The aromatic resin has its source from petroleum fractions produced during the thermal cracking of naphtha, kerosene or gas oil. Such fractions boiling in the range of 140°–280° C. are polymerized with a relatively large amount of phenols, the resulting polymer being highly compatible with commercially available epoxy resins.

5 Claims, No Drawings

COMPOSITE RESINOUS COMPOSITION

BACKGROUND OF THE INVENTION

1. Field of the Invention

This invention relates to resinous compositions, and more particularly such compositions which comprise epoxy resins and aromatic hydrocarbon resins.

2. Prior Art

Generally, epoxy resins are reputed for their superiority in cohesiveness, impact resistance, heat resistance, chemicals resistance, oil resistance and solvent resistance, which qualify their use particularly as a coating material amongst others. However, epoxy resins are highly expensive and hence find limited application. They have a further drawback in that they are poor in water resistance.

Tar-epoxy resins have made their appearance as an improved coating material which is less expensive and better in water resistance than conventional epoxy resin coatings. However, since tar-epoxy coating materials contain bituminous components such as tar pitch, swollen coal and other black substances, it has been considered literally impossible to formulate light colour coating products.

There have been proposed no such counterparts of tar-epoxy coating materials which are capable of retaining the desired light colour feature coupled with comparably low cost and compatibility with epoxy resins.

SUMMARY OF THE INVENTION

With the foregoing difficulties of the prior art in view, the present inventors have now found that certain aromatic hydrocarbon resins prepared under selected conditions can be mixed with epoxy resins to produce a composite resinous composition which possesses the following characteristic features:

1. Better resistance to water and aqueous salt than epoxy resin alone.
2. Versatile colour blends including not only black ones such as of tar-epoxy compositions but also bright colour schemes.
3. Intactness of the inherent properties of epoxy resin proper including excellent resistance to impact, chemicals, oil and solvent.
4. Uniform quality and low cost of aromatic hydrocarbon resin source.

Briefly stated, the aromatic hydrocarbon resins which are to be blended with any commercially available epoxy resins according to the invention seek their source of supply conveniently from hydrocarbon fractions byproduced abundantly during the cracking of petroleum oil, the hydrocarbon fractions containing unsaturated hydrocarbons and boiling in the range of 140°–280° C. Importantly, such hydrocarbon fractions are polymerized with addition of predetermined amounts of phenols.

The invention will be better understood from the following detailed description of certain preferred embodiments.

DETAILED DESCRIPTION OF THE PREFERRED EMBODIMENTS

A main starting material of the aromatic hydrocarbon resin which constitutes one part of the composite resinous composition according to the invention may be by-products readily available from for example the steam cracking of petroleum fractions such as naphtha, kerosene and gas oil into ethylene, propylene, butenes and butadienes. From the petroleum byproducts are selected such cracked fractions which have a boiling point in the range of 140°–280° C. Different fractions boiling in this range may be alternatively further fractionated by distillation, the resulting distillates being suitably combined in suitable ratios. The 140°–280° C. boiling fractions contain large proportions, say about 35–65 percent by weight, of aromatic olefins of 8–10 carbon atoms such as styrene, alkyl styrenes, indene and alkyl indenes.

A sub-starting material of the aromatic hydrocarbon resin according to the invention is phenols including for example, phenol, cresol, xylenol, tert-butylphenol and nonylphenol, which may be used singly or in combination.

100 parts by weight of the main starting material of the aromatic resin are admixed with 7–40 parts by weight of the sub-starting material (phenols) and subjected to polymerization at a temperature ranging between $-10°$ C. and $+80°$ C. for a time period of 10 minutes to 15 hours in the presence of 0.05 to 5 percent by weight of Friedel-Crafts catalysts such as boron trifluoride, aluminum chloride, boron trifluoride-phenol complex and boron trifluoride-dialkylether complex. The catalysts are subsequently removed by addition of caustic soda, sodium carbonate or other alkali. The resulting polymer is washed with water, if necessary, and any unreacted oil and low molecular weight polymers are separated by evaporation or distillation, whereupon there may be obtained a resin having a softening point of 50°–120° C. (measured according to JISK-2531-60) and a number average molecular weight of 500–1,500. This resin is light yellow or yellow and compatible with epoxy resins.

The boiling range of 140°–280° C. above specified of the main starting resin material is an important criterion leading to satisfactory results of the invention. If, for example, cracked petroleum fractions comprising diolefins or mono-olefins of chiefly 5 carbon atoms and boiling in the range of 20°–100° C. were used in place of the specified main starting material, the resulting epoxy resin composition would become less resistant to water, impact or chemicals. However, only small amounts of such deviating fractions not exceeding 20 weight percent may be added to the 140°–280° C. boiling fractions without appreciable effect on the quality of the final composition.

It has also been found that the 140°–220° C. boiling fractions may be subdivided by distillation, for instance, into a first fraction A boiling at 140°–175° C. and a second fraction B boiling at 175°–220° C., the respective sub-fractions being useful as epoxy resin components to suit particular areas of application. The sub-fraction A when employed in the preparation of the aromatic hydrocarbon resin will produce a resin product having a relatively low softening point in the range of 50°–70° C. and a light yellow colour, whereas the use of the sub-fraction B will produce a resin composition having a relatively high softening point in the range of 90°–120° C. and a substantially yellow colour.

The sub-starting material, i.e. phenols, for the aromatic resin according to the invention should be used in amounts of 7–40 weight parts per 100 weight parts of the main starting material, i.e. the 140°–280° C. boiling cracked petroleum fraction. With low molecular weight phenols such as phenol and cresol, the said amount should preferably be 12–20 parts, and with high molecular weight phenols such as tert-butylphenol and nonylphenol, it should preferably be 20–30 parts. Amounts of phenols smaller than 7 parts will not only make the aromatic resin less compatible with the epoxy resin but also deteriorate the impact resistance, cohesiveness and chemicals resistance of the epoxy resin composition. On the other hand, greater phenols than 40 parts will result in objectional colour and notably poor resistance of the resin composition to water and aqueous salt.

The aromatic resins to be blended with epoxy resins according to the invention are identified by infrared absorption spectrum to be abundant in phenolic hydroxyl groups.

The epoxy resins contemplated under the invention are compounds having more than two highly reactive α-epoxy groups in one molecule. Such compounds particularly useful for the purpose of the invention have a molecular weight of 300–3,000 and an epoxy equivalent of 150–3,500, and they are derived typically from the reaction of active hydrogen compounds and epichlorohydrin. Such active hydrogen compounds have more than two phenol-type —OH groups in one molecule, examples of which are bisphenol A, novolak resin and their derivatives. Compounds having carboxyl groups and amino groups may be also used. However, particularly useful for the purpose of the invention are epoxy resins resulting from the reaction of bisphenol A and epichlorohydrin.

The ratio of aromatic resin to epoxy resin should be in the range of 5–90 weight parts to 95–10 weight parts. Departures from this range will result in loss of the inherent properties of the two respective resins. Blends of less than 5 parts aromatic resin and more than 95 parts epoxy resin prove much less water and aqueous salt resistance in the resulting composition, while more than 90 parts aromatic resin blended with less than 10 parts epoxy resin fail to retain the inherent properties of epoxy resin proper.

Advantageously, the composite aromatic and epoxy resin composition according to the invention can be co-used with curing agents or other materials usually employed when epoxy resin is used for coating or forming purposes. Examples of such curing agents are various amines, acid anhydrides, polyamide resins, phenol resins, polyisocyanate and the like which are known for use with epoxy resins. The composite resinous composition of the invention can be also added with reactive diluents such as styrene oxide, olefin oxide, divinyl benzene and diepoxide, as well as unreactive diluents such as triphenyl phosphate and dioctyl phthalate. There may be also used fillers such as mica, silica, calcium carbonate, alumina, iron oxide and talc. Various pigments, if necessary, can be also used.

When the composite resinous composition is to be used as a coating material, it may be dissolved in blend solvents of xylene and butanol, of toluene, methylethyl ketone and methylisobutyl ketone, and of xylene, isopropyl alcohol and ethyl acetate. It may be used alternatively in the form of "non-solvent" coating using liquid epoxy resins or "high solid" coating.

It is also possible to apply the composite composition in the form of a powdery coating by selecting an aromatic resin such that has a softening point as high as 95°–120° C.

The invention will be further described with reference to the following examples which are only illustrative and should not be regarded as limiting the invention thereto.

REFERENCE EXAMPLE 1

To 100 weight parts cracked petroleum fraction boiling in the range of 140°–210° C. and having 37 weight percent of unsaturated components was added 7 weight parts phenol. The admixture was polymerized at 50° C. for 2 hours in the presence of 0.6 weight percent of a boron trifluoride-ethylether complex catalyst. Upon decomposition of the catalyst in a caustic soda solution, the polymer was washed with water and unreacted oil was removed by vacuum distillation, whereby there was obtained 38 weight percent of resin having a softening point of 93° C. The resin was compatible with various commercially available epoxy resins.

For purposes of clarity, the aforesaid petroleum fraction was derived from steam-cracked naphtha.

REFERENCE EXAMPLE 2

The petroleum fraction of Reference Example 2 was subjected to precise-fractionation thereby obtaining a 176°–190° C. boiling fraction. This fraction contained 58 weight percent of unsaturated components and 37 weight percent of indene. 100 weight parts of this fraction was added with 25 weight parts nonylphenol and polymerized at 40° C. for 3 hours in the presence of 0.7 weight percent of a boron trifluoride-phenol complex catalyst.

The resulting polymer was subsequently treated in the manner described in Reference Example 1, whereupon there was obtained 58 weight percent of resin having a softening point of 97° C. The resin was highly compatible with various kinds of commercially available epoxy resins.

REFERENCE EXAMPLE 3

To 100 weight parts of the petroleum fraction of Reference Example 1 were added 15 weight parts of a mixture of 30% phenol, 10% o-cresol, 25% m-cresol, 15% p-cresol and 20% xylenol. The admixture was polymerized at 40° C. for 3 hours in the presence of 2 weight parts aluminum chloride. The polymer was subsequently treated by the procedure of Reference Example 1, whereupon there was obtained 40 weight percent of resin having a softening point of 85° C. This resin was likewise compatible with various epoxy resins.

REFERENCE EXAMPLE 4

The procedure of Reference Example 1 was followed except that only 2 weight parts phenol was added to 100 weight parts of the petroleum fraction of Reference Example 1. There was obtained 34 weight percent of resin having a softening point of 115° C. Compatibility of this resin with epoxy resins was not satisfactory as the blends grew cloudy.

REFERENCE EXAMPLE 5

A petroleum fraction boiling in the range of 20°–80° C. was made available from the steam cracking of naphtha. The fraction upon heating at 100° C. for 4 hours contained 21 weight percent of conjugated diolefins, 17 weight percent of non-conjugated diolefins and 24 weight percent of monoolefins.

The procedure of Reference Example 3 was followed except for the use of the above specific petroleum fraction. There was obtained 31 weight percent of resin having a softening point of 93° C. This resin was hardly compatible with commercially available epoxy resins, as the blends grew cloudy.

INVENTIVE EXAMPLE 1

The various resins prepared according to Reference Examples 1 through 5 were blended with commercially available epoxy resins to produce respective composite coating compositions as shown in Table 1. Each sample coating was subjected to tests specified by Japanese Industrial Standards K5664-1972, with the results shown in Table 2.

Table 1

| | Coating Blends | | | | | |
|---|---|---|---|---|---|---|
| | Inventive Example 1 | | | Comparative Example 1 | | |
| Sample No. | 1 | 2 | 3 | 4 | 5 | 6 |
| Solution I (wt. parts) | | | | | | |
| epoxy resin[*1] | 20.1 | 20.1 | 20.1 | 20.1 | 20.1 | 18.8 |
| methylethyl ketone | 3.6 | 3.6 | 3.6 | 3.6 | 3.6 | 3.2 |
| cyclohexanone | 3.7 | 3.7 | 3.7 | 3.7 | 3.7 | 3.2 |
| xylene | 7.2 | 7.2 | 7.2 | 7.2 | 7.2 | 6.2 |
| Solution II (wt. parts) | | | | | | |
| aromatic resin | 30.1 | 30.1 | 30.1 | 30.1 | 30.1 | 28.1 |
| | (Ref.Exp.1) | (Ref.Exp.2) | (Ref.Exp.3) | (Ref.Exp.4) | (Ref.Exp.5) | (tar-pitch) |
| polyamide resin[*2] | 14.0 | 14.0 | 14.0 | 14.0 | 14.0 | 13.1 |
| methylethyl ketone | 5.4 | 5.4 | 5.4 | 5.4 | 5.4 | 6.8 |
| cyclohexanone | 5.4 | 5.4 | 5.4 | 5.4 | 5.4 | 6.8 |
| xylene | 10.6 | 10.6 | 10.6 | 10.6 | 10.6 | 13.8 |

Note:
[*1] is Shell Chemicals' "Epikote 1001" having an epoxy equivalent of 450–500.
[*2] is General Mills' "Versamid 100."

Table 2

| | | Coating Tests | | | | | |
|---|---|---|---|---|---|---|---|
| | | Inventive Example 1 Sample No. | | | Comparative Example 1 Sample No. | | |
| Tests | Conditions | 1 | 2 | 3 | 4 | 5 | 6 |
| Dupont impact test | 500g dropped 30cm high | pass | pass | pass | cracked | cracked | pass |
| Alternate heat and cool test | −20° C. ⇌ 80° C. for three times | pass | pass | pass | cracked | cracked | pass |
| Salt spray test | 120 hrs. | pass | pass | pass | partially peeled | partially peeled | pass |
| Humidity resistance test | 50° C., 95% relative humidity for 120 hrs. | pass | pass | pass | peeled | peeled | pass |
| Alkali resistance test | 5% aqueous caustic soda for 168 hrs. | pass | pass | pass | pass | pass | pass |
| Acid resistance test | 5% aqueous sulfuric acid for 168 hrs. | pass | pass | pass | blistered | blistered | gloss diminished |
| Gasoline resistance test | petroleum benzene for 48 hrs. | pass | pass | pass | blistered | blistered | pass |
| Aqueous salt resistance test | 3% aqueous NaCl 40° C. for 168 hrs. | pass | pass | pass | blistered | blistered | partially blistered |

INVENTIVE EXAMPLE 2

The aromatic resin prepared according to Reference Example 2 was blended with a commercially available epoxy resin to produce a composite coating composition as shown in Table 3 below.

Table 3

| Sample No. | Inventive Example 2 7 | Comparative Example 2 8 |
|---|---|---|
| Epikote 1007/DIPA[*3] | 46 | 50 |
| Resin of Ref. Exp. 2 | 10 | 0 |
| Desmodur L[*4] | 59 | 65 |
| Rutile titanium white | 70 | 70 |
| Methylisobutyl ketone | 19 | 19 |
| n-butylacetate cyclohexanone | 9 | 9 |
| Cyclohexanone | 9 | 9 |

Table 3-continued

| Sample No. | Inventive Example 2 7 | Comparative Example 2 8 |
|---|---|---|
| Toluene | 13 | 13 |

Note:
[*3] is a resin obtained by reacting 110 grams of Shell Chemicals' Epikote 1007 with 10 grams of diisopropanolamine at 180° C. for 2 hours.
[*4] is a Bayer's polyisocyanate.

The above samples were tested with the results shown in the following table.

Table 4

| Sample No. | 7 | 8 |
|---|---|---|
| Complete cure (hrs.) | 2 | 2 |
| Flexing test (2mm) | pass | pass |
| Artificial saline (20° C.) | No blister after 3 months | Slightly blistered after 3 months |

What we claim is:
1. A composite resinous composition comprising:
(a) 5–90 weight parts of an aromatic resin resulting from the polymerization of 100 weight parts of cracked petroleum fractions which consists of unsaturated hydrocarbons and boiling in the range of 140°–280° C., the aromatic resin having a softening point of 50°–120° C. and a number average molecular weight of 500–1,500, and 7–40 weight parts of phenols in the presence of Friedel-Crafts catalysts; and (b) 95–10 weight parts of an epoxy resin.

2. A composition as claimed in claim 1 wherein said cracked petroleum fractions are produced from the thermal cracking of naphtha, kerosene or gas oil.

3. A composition as claimed in claim 1 wherein said phenols are selected from the group consisting of phenol, cresol, xylenol, tert-butylphenol and nonylphenol.

4. The composition according to claim 1 wherein the boiling point of the cracked petroleum fraction is 176°–190° C.

5. A composite resinous composition comprising (a) 5–90 weight parts of an aromatic resin resulting from the polymerization of 100 weight parts of cracked petroleum fractions which consists of unsaturated hydrocarbons containing an amount not in excess of 20% by weight of a fraction of boiling point 20°–100° C., the remainder boiling in the range of 140°–280° C., the aromatic resin having a softening point of 50°–120° C., and a number average molecular weight of 500–1,500, and 7–40 parts by weight of phenols in the presence of Friedel-Crafts catalysts; and (b) 95–10 weight parts of an epoxy resin.

* * * * *